United States Patent [19]

Kucera et al.

[11] Patent Number: 4,564,567

[45] Date of Patent: Jan. 14, 1986

[54] ELECTRONICALLY CONDUCTIVE CERAMICS FOR HIGH TEMPERATURE OXIDIZING ENVIRONMENTS

[75] Inventors: Gene H. Kucera, Downers Grove; James L. Smith, Lemont; James W. Sim, Evergreen Park, all of Ill.

[73] Assignee: The United States of America as represented by the United States Department of Energy, Washington, D.C.

[21] Appl. No.: 550,697

[22] Filed: Nov. 10, 1983

[51] Int. Cl.$^4$ ............................................ H01M 4/86
[52] U.S. Cl. ....................................... 429/41; 429/45
[58] Field of Search ..................................... 429/41, 44

[56] References Cited

U.S. PATENT DOCUMENTS

| | | | |
|---|---|---|---|
| 2,562,705 | 7/1951 | Ellestad et al. | 23/58 |
| 2,914,596 | 11/1959 | Gorin et al. | 429/34 |
| 2,993,011 | 7/1961 | Johnson et al. | 252/219 |
| 2,995,413 | 8/1961 | Kemp | 96/43 |
| 3,367,802 | 2/1968 | Rhodes | 429/40 |
| 3,503,902 | 3/1970 | Shimoda | 252/517 |
| 3,684,578 | 6/1972 | Makishima et al. | 429/33 |
| 4,094,061 | 6/1978 | Gupta et al. | 29/612 |
| 4,132,619 | 1/1979 | Klein et al. | 429/40 X |
| 4,203,871 | 5/1980 | Horowitz et al. | 252/518 |
| 4,225,469 | 9/1980 | Horowitz et al. | 252/518 |

FOREIGN PATENT DOCUMENTS

| | | |
|---|---|---|
| 30834 | 6/1981 | European Pat. Off. . |
| 1285199 | 8/1972 | United Kingdom . |

OTHER PUBLICATIONS

Argonne National Laboratory, Molten Carbonate Fuel Cell, Group Monthly Report, 6/5/85, pp. 1-6.
Van Nostrand's Scientific Encyclopedia, 1976, p. 2071.
Dept. of Energy, Development of Molten Carbonate Fuel Cell Power Plant, Quarterly Report, 6/3/81, pp. 44-46.
Dept. of Energy, Development of Molten Carbonate Fuel Cell Power Plant, Final Report, 3/85, vol. 1, pp. V, 5; vol. 4, pp. 143-148.
Argonne National Laboratory, Molten Carbonate Fuel Cell, Group Quarterly Report, 12/16/83, pp. 53, 17-18.
United Technologies Corporation, Development of Molten Carbonate Fuel Cell Power Plant Technology, 11/84, pp. 3-8.
Chemical Abstracts: 87: 142129, 90: 65842, 92: 102534, 96: 78754, 99: 90029, 100: 158672.
Derwent (WPI) Abstracts: 26138y/15, 83-798836/43.
Sim et al., "Development of Cathode Materials for the Molten Carbonate Fuel Cell", *National Fuel Cell Seminar Abstracts*, Nov. 14-18, 1982.

*Primary Examiner*—Brian E. Hearn
*Assistant Examiner*—Stephen J. Kalafut
*Attorney, Agent, or Firm*—William Lohff; Hugh W. Glenn; Judson R. Hightower

[57] ABSTRACT

A high temperature, ceramic composition having electronic conductivity as measured by resistivity below about 500 ohm-cm, chemical stability particularly with respect to cathode conditions in a molten carbonate fuel cell, and composed of an alkali metal, transition metal oxide containing a dopant metal in the crystalline structure to replace a portion of the alkali metal or transition metal.

4 Claims, 1 Drawing Figure

ELECTRONICALLY CONDUCTIVE CERAMICS FOR HIGH TEMPERATURE OXIDIZING ENVIRONMENTS

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to ceramic compositions having chemical stability and electronic conductivity at temperatures in the range of 500°–700° C. and more particularly to ceramic compositions useful as cathodes in molten carbonate fuel cells. More specifically, the ceramic compositions have a crystalline structure based on an alkali-metal, transition-metal oxide whose insulating properties have been changed by the substitution of a third metal for a small portion of the alkali metal and/or transition metal in the crystalline structure of the resulting ceramic composition thereby providing favorable electronic conductivity. Various electrode compositions have been previously disclosed for particular fuel cells. U.S. Pat. No. 3,367,802 includes a disclosure of a fuel electrode to be used with an acid electrolyte in a low temperature cell. However, the composition would not be suitable for use at high temperatures in an oxidizing environment and in contact with molten carbonate. U.S. Pat. No. 4,132,619 is also directed to an electrode composition having similar limitations. Disclosures of other compositions are in U.S. Pat. Nos. 3,684,578; 4,203,871 and 4,225,469.

Molten carbonate fuel cells include an anode such as porous nickel, a cathode such as porous lithiated nickel oxide and a molten carbonate electrolyte retained in a porous tile. A representative electrolyte is a mixture of $Li_2CO_3$ and $K_2CO_3$. In the past, molten carbonate fuel cells of the above type were assembled with a sintered nickel oxide cathode which was lithiated in situ with $Li_2CO_3$ in the presence of an oxidant gas (a mixture including $O_2$ and $CO_2$) to form lithiated nickel oxide. The lithiation (incorporation of lithium ion in the NiO crystalline structure) of the nickel oxide was important in providing electronic conductivity in the cathode. While many characteristics of the cathode were desirable, it was found that the cathode was not stable in the presence of the molten carbonate electrolyte, and would lose nickel oxide to the electrolyte. It further was observed that the nickel ion in the electrolyte was reduced to nickel metal under conditions at or near the anode. The result was a continuous loss of cathode material. In a similar manner, while some iron oxides were conductive initially and offered some promise as cathode materials, all were found to change in composition during contact with the electrolyte at cell temperatures of 600°–700° C. and change to an essentially nonconductive composition. Under these circumstances, the lithiated nickel and iron oxides did not appear to provide the desired stability plus conductivity during the expected lifetime of $4 \times 10^4$ hours projected for commercial cells.

In the development of cathode materials for molten carbonate fuel cells, one approach has been to select known conductive materials and test them for chemical stability in the fuel cell cathode environment. Initial results have been less than promising. In general, the known conductive materials do not exhibit a desired combination of chemical stability and electronic conductivity as cathodes at temperatures of 600°–700° C. and in a molten carbonate fuel cell environment.

Accordingly, one object of this invention is to develop ceramic compositions having chemical stability and electronic conductivity at 500°–700° C. A second object of the invention is to develop ceramic compositions useful in forming cathodes for fuel cells. A third object of the invention is to develop a fuel cell cathode for a molten carbonate fuel cell. Another object of the invention is to develop a fuel cell cathode essentially insoluble in molten carbonate electrolyte. A further object is to develop a conductive ceramic for use in other high temperature environments such as MHD equipment. These and other objects will become apparent from the following description.

SUMMARY OF THE INVENTION

Briefly, the invention relates to a high temperature, ceramic composition having electronic conductivity as measured by a resistivity below about 500 ohm-cm., its use as a fuel cell cathode, and to a method of producing the composition wherein electronic conductivity is imparted to an otherwise ceramic insulator and the final crystalline form is essentially unchanged except for the dopant substitution. The ceramic composition essentially consists of an alkali-metal, transition-metal oxide containing a dopant metal in the crystalline structure to replace a portion of the alkali metal or transition metal.

The dopant metal is selected on the basis that (1) its ionic radius is the same or smaller than the radius of the metal being replaced and (2) its valence is different by plus or minus 1-2 units from the valence of the metal being replaced. The doped alkali-metal, transition-metal oxide may be represented by the following general formula:

$$A_w M_x T_y O_z$$

wherein A is the alkali metal, M is the dopant metal, T is the transition metal, the values of w, x, y and z are positive with w differing from the value in the undoped compound by no more than x and usually being from 0.75–3.0, x being about 0.05–0.25, y differing from the value in the undoped compound by no more than x and usually being from 0.75–1.0 and z being in the range of about 2–6 for a stoichiometric balance. With the dopant metal M replacing a minor portion of the alkali metal or transition metal, the values of w and x and x and y are interdependent. The values of w and y may be other than an integer; some transition metal must be at a valence state different from the major portion to provide a charge balance.

The method is carried out by (1) identifying the stable transition metal compounds, (2) selecting a dopant metal ion to be substituted for one of the metals in the crystalline structure of the undoped alkali-metal, transition-metal oxide, (3) forming an intimate mixture of oxide-affording compositions of the dopant metal and the transition metal, and (4) combining the mixture with an excess of an alkali metal composition under high temperature reaction and oxidizing conditions to form the doped, alkali-metal, transition-metal oxide. In the method, the dopant metal is substituted for the alkali metal or the transition metal to form the desired composition in which the dopant metal is incorporated in the crystalline structure as a replacement for part of the alkali metal or transition metal with the valence of the dopant metal being plus or minus 1-2 units from that of the metal being replaced. Advantageously, the alkali metal composition and the reaction conditions relate to cathode environment conditions for a molten carbonate fuel cell where the temperature is about 600°-700° C., the alkali metal composition is one or more alkali metal carbonates, and the oxidizing conditions include $O_2$ and $CO_2$.

As an illustration, tests indicate that $Li_2MnO_3$ has a resistivity of about $1 \times 10^4$ ohm-cm at 650° C. When Mg is substituted in the structure to form the nominal composition $Li_{1.8}Mg_{0.2}Mn_{0.2}{}^{+3}Mn_{0.8}{}^{+4}O_3$, tests indicate the resistivity to be less than about 20 ohm-cm at 650° C. As indicated by this formula, the Mg ion has been substituted for a portion of the Li ion in the crystalline structure resulting in an apparent equivalent accommodation of oxidation state of $Mn^{+4}$ to $Mn^{+3}$.

DETAILED DESCRIPTION OF THE PREFERRED EMBODIMENT

Figure 1:
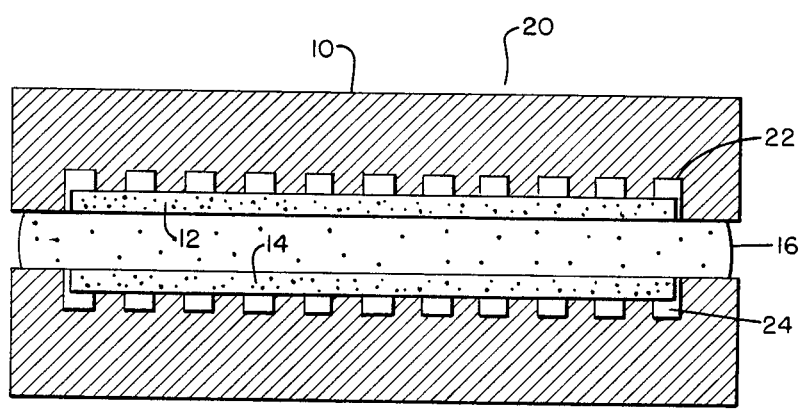
FIG. 1 is a cross-sectional view of a molten carbonate fuel cell incorporating one embodiment of the invention.

The doped alkali-metal, transition-metal oxide of the invention provides a high temperature ceramic having a useful combination of chemical stability and electronic conductivity in the particular environment of use. Advantageously, these properties are provided at temperatures in the order of 500°-700° C. and in the presence of at least one alkali metal carbonate. While these conditions relate to molten carbonate fuel cells, they also may be present in other high temperature systems such as magnetohydrodynamics (MHD) and the like. Therefore, while the following description may relate to molten carbonate fuel cells, it is not intended to limit the utility of the ceramic composition of this invention.

In a fuel cell cathode environment associated with molten carbonate fuel cells with an operating temperature of about 600°-700° C., chemical stability relates to the cathode remaining essentially unchanged in composition in the presence of a molten carbonate electrolyte and an oxidant gas. With respect to the electrolyte, one aspect of this is that the conductive ceramic in the cathode should be essentially insoluble (a solubility of about 10-100 ppm or below) in the electrolyte. With respect to the oxidant gas which advantageously is a mixture of $O_2$ and $CO_2$ in a mole ratio of 1:2, the conductive ceramic is chemically stable if it maintains the desired conductivity although undergoing a slight change in oxidation state with changing gas ratio.

Suitably, the transition metal has an atomic number in the range of about 21-80 (e.g., Ti, Cr, Mn, Co, Cu, Zn, Nb, Ru, Cd, Ta, W, Ir and Hg). Advantageously, the transition metal has an atomic number of 21-30 since these are more readily obtainable and conveniently form alkali-metal, transition-metal oxides.

Suitably, the alkali metal has an atomic number of 3-19 including Li, Na and K. One or more alkali metals may be used such as Li and K. Generally the alkali metal is Li.

Illustrations of the alkali-metal, transition-metal oxide for doping include $Li_2TiO_3$, $Li_2MnO^3$, $Li_3VO_4$, $Li_3TaO_4$, $K_2WO_4$, $LiFeO_2$, and $Li_2SnO_3$.

Without the substitution of the dopant metal, the stable compounds of most transition metal oxides in the fuel cell cathode environment have a resistivity in excess of 500 ohm-cm and more usually in the order of about $1 \times 10^4$ ohm-cm and are therefore insulators. By the substitution of a dopant metal ion in the crystalline structure of a stable alkali-metal, transition-metal oxide, the high resistivity may be reduced thereby resulting in values below about 500 ohm-cm and preferably below about 100 ohm-cm. Stable compositions with these values have use in fuel cells and other product areas where high temperature stability and electronic conductivity are needed.

Accordingly, the dopant is a metal ion capable of being selectively substituted for the alkali metal or transition metal in the undoped alkali-metal, transition-metal oxide. The dopant is usually selected on a first basis that its ionic radius is not substantially greater than the ionic radius of the alkali metal or transition metal for which it is to be substituted in the stable composition. Second, the dopant metal should have an oxidation state different by plus or minus 1-2 units from the final oxidation state of the alkali metal or transition metal in the stable compound. In general for selecting a dopant, a final ceramic crystalline form with a given chemical composition except for the metal-ion dopant is determined. Then, depending on whether the alkali metal or transition metal will be replaced by the metal-ion dopant, the particular dopant will be selected on the above basis. To illustrate, in the stable compound $Li_2MnO_3$, $Mn^{+4}$ and $Li^{+1}$ have ionic radii of about 0.53 Å, and about 0.68 Å, respectively; the dopant ion $Mg^{+2}$ has an ionic radius of about 0.68 Å. Substitution would therefore be expected at the lithium site and dopant valence differs from the lithium valence by plus one.

Tables of crystal ionic radii of the elements may be found in various handbooks including the *Handbook of Chemistry and Physics, Periodic Table of the Elements* by E. H. Sargent & Co.

The amount of the dopant metal in the alkali-metal, transition-metal oxide will depend on the maximum capable of being incorporated in the crystalline structure and of producing the desired conductivity. In general, the dopant metal may be present in a minor amount sufficient to impart conductivity in the alkali-metal, transition-metal oxide. Advantageously, the dopant metal is present in an atomic ratio with respect to the transition metal of about 0.01-0.25.

Suitably, the dopant metal (in the form of a carbonate, hydroxide, oxide or other form) is capable of being substituted for the alkali metal and/or transition metal in the resulting crystalline structure. Suitable dopant metals include Group 2A (Mg, Ba) and 3A (Al, Ga, In) elements, any of the transition metals (Zn, Mn, Ni, Fe, Ti, Zr, Co, Cu, Cr) Group 4A (Ge, Sn, Pb) elements and Group 5A (As, Sb). Advantageously, the metal is a metal or metals of the group identified by Mg, Al, Mn, Ni, Fe, Ti, Zr, Co, Cu, and Cr and differs from the transition metal identified with the final compound.

The invention is further directed to a method of producing a dopant-containing alkali-metal, transition-metal oxide composition having a crystalline structure, chemical stability at temperatures in the order of 500°-700° C., and electronic conductivity as measured by a resistivity below about 500 ohm-cm, comprising the steps of (1) selecting a dopant metal ion to be substituted for one of the metals in an undoped alkali-metal, transition-metal oxide, (2) forming an intimate mixture of oxide-affording compounds of a multivalent transition metal and the dopant containing a metal cation capable of differing in valence from said one metal by plus or minus 1-2 units, and having an ionic radius not greater than the radius of said one metal, the dopant metal being present in a minor amount in the mixture sufficient to provide an atomic ratio of dopant metal to the transition metal of about 0.01-0.25 and electronic conductivity in the doped alkali-metal, transition-metal oxide, and (3) combining the intimate mixture and an excess of an alkali metal compound under reaction conditions including a temperature of at least about 500° C., an oxidant gas, and a reaction time sufficient to form the doped alkali-metal, transition-metal oxide as a solid ceramic composition containing at least a portion of the metal cation of the dopant being incorporated in the crystalline structure of the ceramic composition and differing in valence from said substituted metal by plus or minus 1-2 units.

One effective technique to incorporate the dopant metal in the crystalline structure of the alkali-metal, transition-metal oxide is to form an intimate mixture of the oxide-affording compound of the dopant metal and the transition metal. This may be carried out by grinding both compositions into fine powders (about $\leq 1$ $\mu$m in diameter) and thoroughly mixing the powders. The dopant metal compound may also be precipitated as small particles of a hydroxide or the like on the transition metal oxide. A third approach is to coprecipitate the compounds of the dopant metal and transition metal to provide a mixture of small particles. Other methods include spray and freeze drying.

The mixture resulting from the above processing steps may be further treated by being heated to an elevated temperature for a time sufficient to diffuse further the dopant metal and the transition metal oxide. Advantageously, the temperature is in the order of about 1100° C. and the time about 100 hours. The resultant intimate mixture is then combined with an alkali metal compound under reaction conditions to produce the stable in-cell compound, usually forming a doped alkali-metal, transition-metal oxide having the dopant metal substituted for the alkali metal or transition metal in a minor amount sufficient to provide electronic conductivity as measured by a resistivity below about 500 ohm-cm.

Suitably, the reaction is carried out at temperatures of at least about 500° C., advantageously about 500°-1000° C. and preferably about 600°-800° C. for a time to form the alkali-metal, transition-metal oxide containing the dopant metal.

Preferably for the molten carbonate fuel cell cathode, the method uses a transition metal having a reduction potential more negative than about 1.08 V based on a reference of $O_2$ and $CO_2$ in a mole ratio of 1:2, eliminating possible reduction-deposition of the soluble transition-metal species in the anode environment.

Since the doped alkali-metal, transition-metal oxide of the invention is particularly useful in a molten carbonate fuel cell, the oxide may be formed into a cathode by conventional ceramic fabrication techniques such as tape casting, extrusion, or cold pressing, followed by sintering. The resultant fuel cell comprises a fuel electrode, an oxidant electrode or cathode, and an electrolyte disposed between the electrodes with the cathode comprising the oxide composition of the invention.

Advantageously, excess alkali metal compound is present during the reaction with the excess in the order of about 5-100 mole percent and preferably about 25-60 mole percent. The alkali metal compound used in the reaction preferably is the same as that in the electrolyte, and the gaseous environment is that of the fuel cell cathode. With an electrolyte containing $Li_2CO_3$ with $K_2CO_3$, an alkali metal compound used in the reaction should be a lithium compound such as $Li_2CO_3$, LiOH or the like, or $K_2CO_3$, KOH or the like depending on the stable transition metal compound.

FIG. 1 provides an illustration of a representative fuel cell incorporating one embodiment of the invention. As illustrated, fuel cell 10 includes a porous cathode 12 of $Li_{1.8}Mg_{0.2}MnO_3$ and a porous anode 14 of nickel separated by a tile 16 containing a mixture of $Li_2CO_3$ and $K_2CO_3$. Typically, the cathode has a dual porosity provided by pores of about 10-20 $\mu$m and $\leq 1$ $\mu$m in diameter. The pores of the anode 14 are about 10-20 $\mu$m in diameter while those of the tile 16 are about 1-3 $\mu$m in diameter. Representative thicknesses for the cathode 12, anode 14 and tile 16 are about 0.015, 0.20, and 0.020-0.050 inches, respectively. These components are held in a stainless steel housing 20 provided with slots 22 and 24 for carrying oxidant gas and fuel gas to the cathode and anode respectively.

The following examples are provided for illustrative purposes and are not intended to be restrictive as to the scope of the invention:

EXAMPLE I

In the preparation of Mn-substituted $LiFeO_2$, as a composition of the invention, 500 ml distilled water, 50 ml of an aqueous solution of $Mn(NO_3)_2 \cdot 4H_2O$ (0.25 g/ml) and 300 ml of an aqueous ammonia solution (about 5.8 wt. % $NH_3$) were added to about 330 ml of an aqueous solution of $Fe(NO_3)_3 9H_2O$ (0.3 g/ml) during stirring. This resulted in a suspension of iron and manganese hydroxide particles. The suspension was centrifuged, the supernatant liquid was decanted, and the iron-manganese hydroxide particles were washed with about 750 ml distilled water. The suspension was centrifuged again, the supernatant liquid was decanted, and the iron/manganese hydroxide was dried in a drying oven at a temperature of about 150° C. About 14.78 g $Li_2CO_3$ (about 40 mole % excess) was added to the dried iron/manganese hydroxide (26.89 g) as an intimate mixture, and the resulting mixture was ground and then heated at about 700° C. for 60 hours and at 850° C. for 60 hours. The resulting powder was washed with distilled water to remove excess $Li_2CO_3$, pressed into a pellet (using paraffin binder) and sintered at about 1050° C. for about 1 hour. The resistivity of this pellet was approximately 5-6 ohm-cm at 650° C.

EXAMPLE II

In the preparation of Mg-substituted $Li_2MnO_3$, amounts of $Mn_2O_3$ and MgO to provide a Mn/Mg mole ratio of about 10:1 were ground together to provide a fine powder which was then heated at 1100° C. in air for approximately 100 hr. The intimate mixture was then combined with a stoichiometric amount of $Li_2CO_3$ plus excess $Li_2CO_3/K_2CO_3$ (about 50% excess) at a temperature of about 700° C. for about 100 hour. The carbonates were water-washed from the resultant product. A pellet of the product was pressed and sintered at about 1300° C. for about 2 hours. The resistivity of the resultant product was about 12 ohm-cm at 650° C.

EXAMPLE III

In another preparation of Mg-substituted $Li_2MnO_3$, $Mg(NO_3)_2$ and $Mn(NO_3)_2$ at a mole ratio of 5:1 were dissolved in water. The solution was dried while stirring. The residue was then heated to and held at 1100° C. for 100 hours. The intimate mixture was then combined with $LiCO_3$ with an excess of $Li_2CO_3/K_2CO_3$ (about 50% excess) as generally described in Example II. The resistivity of the resultant product was about 36 ohm-cm at 650° C.

EXAMPLE IV

In a third preparation of Mg-substituted $Li_2MnO_3$, a mixture of $Mn(NO_3)_2$ and $Mg(NO_3)_2$ was precipitated as a mixture of hydroxides from an aqueous solution. $NH_4OH$ was used in the precipitation. The mole ratio of Mn/Mg was about 10:1. The precipitate was then combined with $Li_2CO_3$ with an excess of $Li_2CO_3/K_2CO_3$ (about 50% excess) as generally described in Example II. The resistivity of the resultant product was about 8-9 ohm-cm at 650° C.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A fuel cell comprising a fuel electrode, and oxidant electrode, an electrolyte member disposed between the electrodes, said member containing alkali metal carbonate mixture including lithium carbonate, the oxidant electrode comprising the electronically-conductive lithium, transition-metal oxide selected from the group consising of $Li_2MnO_3$ with magnesium dopant and $LiFeO_2$ with manganese dopant the oxide having electronic conductivity as measured by a resistivity below about 100 ohm-cm., high temperature stability in the presence of molten alkali metal carbonate including lithium carbonate at a temperature in the order of 500°–700° C., and a crystalline structure incorporating the lithium and transition metals and the dopant incorporated in the crystalline structure as a partial substituent for one of said metals.

2. The fuel cell of claim 1 wherein the oxide composition includes the dopant metal in an atomic ratio with respect to the transition metal of about 0.01–0.25.

3. The fuel cell of claim 1 wherein said oxidant electrode comprises a crystalline structure of $Li_2MnO_3$ having magnesium dopant in partial substitution for one of the metals in the crystalline structure.

4. The fuel cell of claim 1 wherein said oxidant electrode comprises a crystalline structure of $LiFeO_2$ having manganese dopant in partial substitution for one of the metals in the crystalline structure.

* * * * *